United States Patent [19]
Bowen et al.

[11] Patent Number: 5,417,727
[45] Date of Patent: May 23, 1995

[54] NOISE ATTENUATING AIR CLEANER ASSEMBLY FOR AN INTERNAL COMBUSTION ENGINE

[75] Inventors: Peter W. Bowen, Geneva, Switzerland; John C. Faust, Burnsville; Thomas G. Miller, Lafayette, both of Minn.; Martin G. Schrader, Lafayette, Ind.

[73] Assignee: Caterpillar Inc., Peoria, Ill.

[21] Appl. No.: 286,593

[22] Filed: Aug. 5, 1994

Related U.S. Application Data

[63] Continuation of Ser. No. 21,706, Feb. 24, 1993, abandoned.

[51] Int. Cl.⁶ .................. B01D 39/18; B64D 33/02; F01N 3/02; F02M 35/12
[52] U.S. Cl. .................................. 55/276; 55/490; 55/500; 55/510; 55/521; 55/522; 55/DIG. 21; 181/214; 181/229; 181/231
[58] Field of Search ............... 55/276, 467, DIG. 21, 55/457, 498, 500, 510, 521, 522; 181/214, 222, 224, 229, 231

[56] References Cited

U.S. PATENT DOCUMENTS

| | | | |
|---|---|---|---|
| 2,691,424 | 10/1954 | Sebok | 55/276 |
| 3,039,254 | 6/1962 | Thornburgh | 55/276 |
| 3,686,837 | 8/1972 | Hopkins et al. | 55/487 |
| 3,759,157 | 9/1973 | Larkfeldt et al. | 181/224 X |
| 4,089,663 | 5/1978 | Kulig et al. | 55/276 |
| 5,106,397 | 4/1992 | Jaroszczyk et al. | 55/276 X |

Primary Examiner—Robert J. Warden
Assistant Examiner—L. M. Crawford
Attorney, Agent, or Firm—Dennis C. Skarvan

[57] ABSTRACT

A noise attenuating air cleaner assembly for an internal combustion engines or the like operating in a dusty environment. The air cleaner assembly having a silencer assembly arranged concentric inside an air filter cartridge assembly and a noise attenuating end wall assembly closing an end of the air filter cartridge assembly attenuating air cleaner assembly to provide a source of clean air to the engine and to reduce transmitted induction noise.

20 Claims, 3 Drawing Sheets

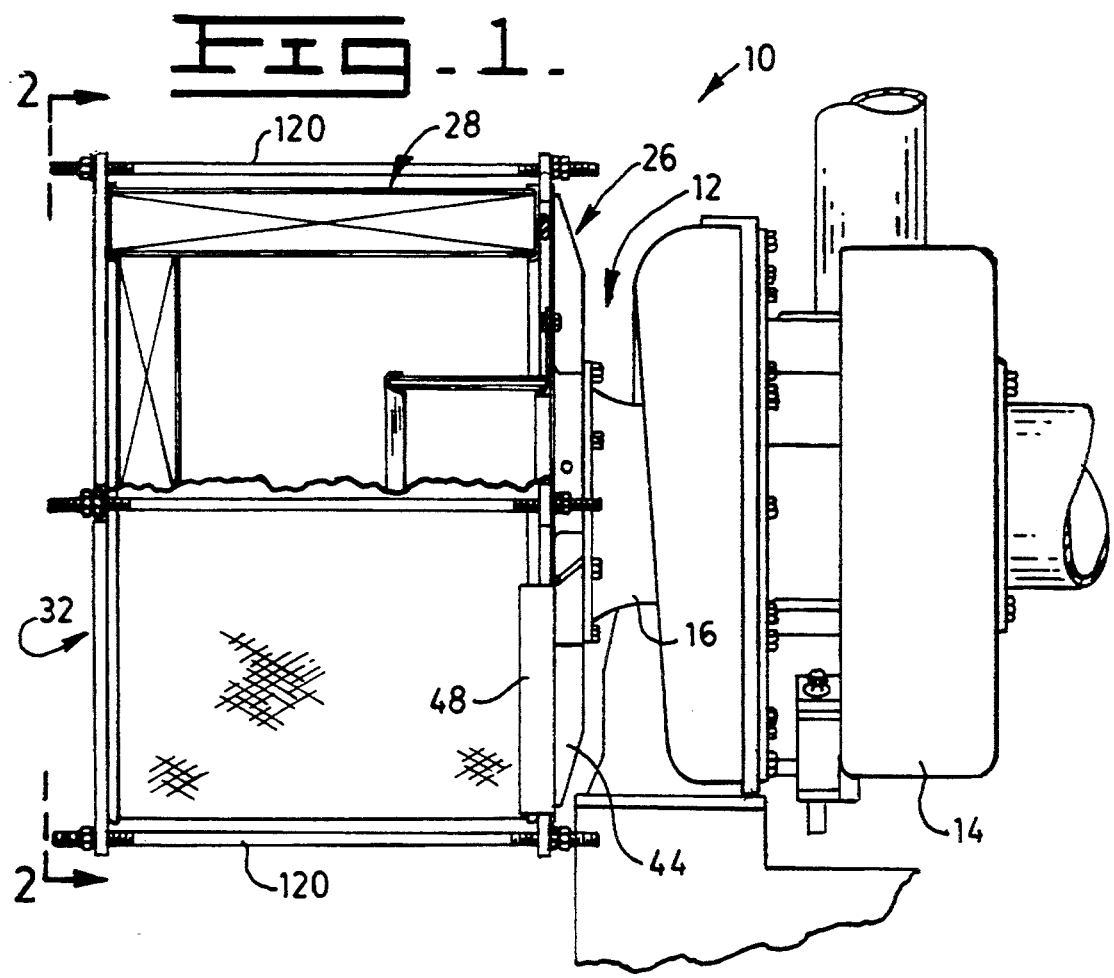
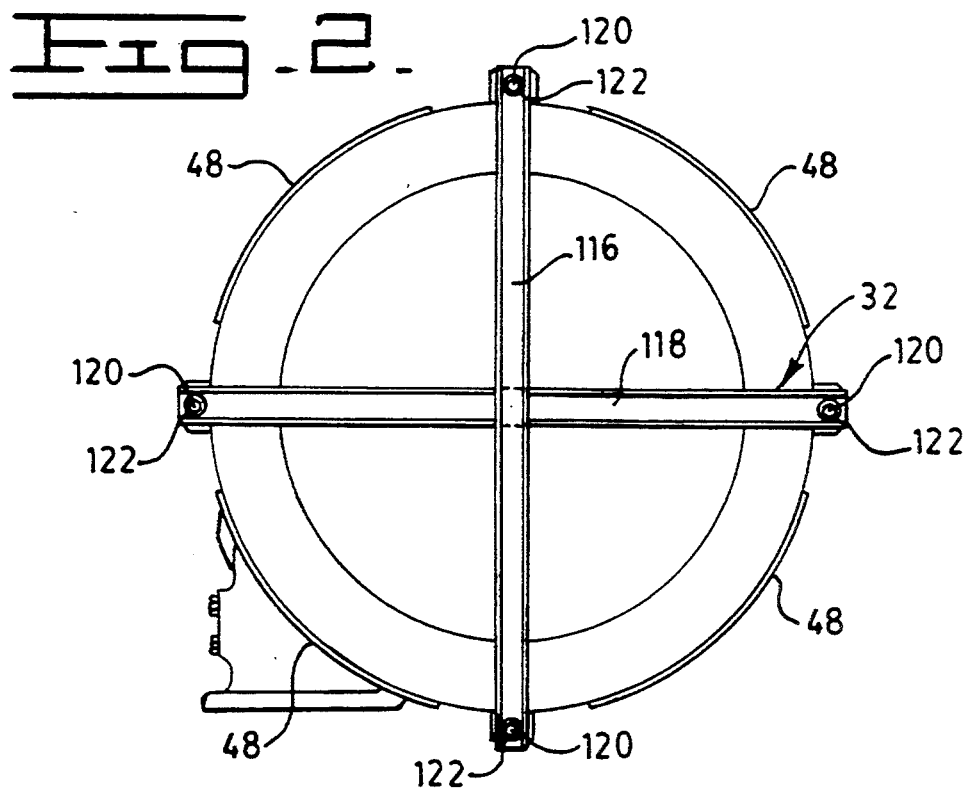

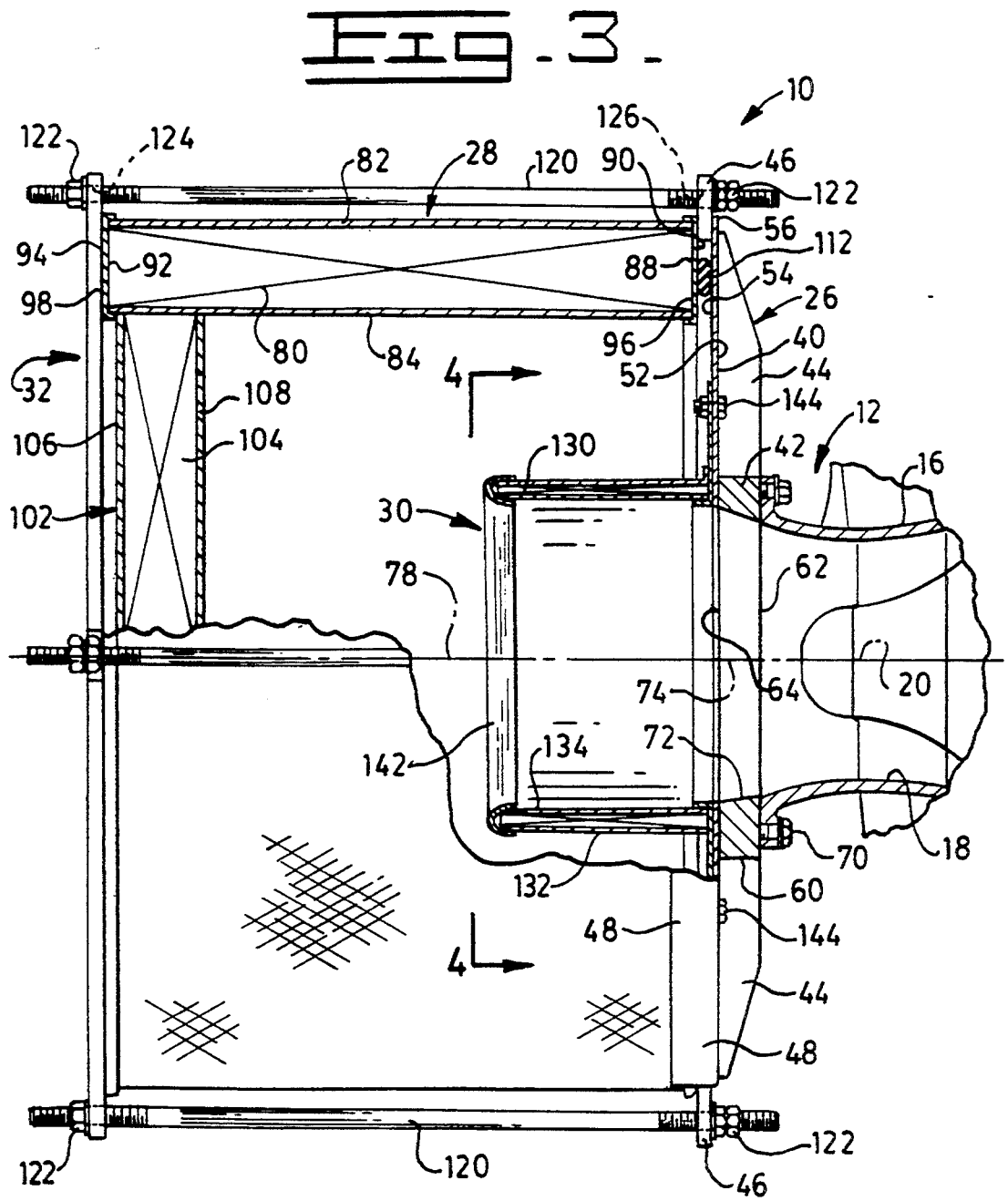

NOISE ATTENUATING AIR CLEANER ASSEMBLY FOR AN INTERNAL COMBUSTION ENGINE

This is a file wrapper continuation of application Ser. No. 08/021,706, filed Feb. 24, 1993, now abandoned.

TECHNICAL FIELD

This invention relates generally to a noise attenuating air cleaner assembly for internal combustion engines or the like. More particularly, the invention relates to a noise attenuating air cleaner assembly to provide a source of clean air to the engine and to reduce transmitted induction noise.

BACKGROUND ART

An air cleaner assembly is used to provide a source of clean air to an internal combustion engine. The air cleaner assembly is necessary for efficient performance of the engine having an affect on fuel efficiency and engine life. In most applications the air cleaner assembly is attached directly to an air induction system for the engine and filters air at the point of entry into the air induction system. The air cleaner assembly is expected to have a disposable or serviceable air intake filter cartridge with a large dust accumulation capacity, for a corresponding long service life, and have good filtering efficiency over the entire duration of their service life.

An additional requirement, common to all air intake filter cartridges, is low flow resistance across the filter cartridge. This flow resistance increases gradually, as the layer of accumulated dust on the filter cartridge grows thicker, until it reaches a predetermined critical flow resistance at which time the filter cartridge has to be replaced or serviced. A clogged air filter cartridge restricts air passage, thereby preventing fuel and air from mixing at an optimal fuel/air ratio for combustion. Since the results of running an engine with a dirty air filter cartridge is undesirable, it is advantageous and cost efficient to have an easily serviceable air filter cartridge.

Although the air cleaner assembly may be affective for removing dust and other airborne contaminates from entering the engine, it is generally not effective in reducing transmitted induction noise. Transmitted induction noise is sound generated by the engine and includes combustion, valve, turbocharger, the flow of the air as it is being drawn into the engine, and other noises.

In some shipboard applications, it is common practice to provide bulkhead or wall mounted air cleaners to filter the air that enters the engine room or compartment and not filter the air at the point of entry into the air induction system. Generally in such arrangements, an engine mounted silencer assembly is employed to reduce the transmission of the induction noise. The silencer assembly is connected directly to the air induction system. The silencer assembly may include a debris filter to prevent large objects such as tools, detached engine parts, birds or the like from being dropped or ingested into the engine.

The wall mounted air cleaners and engine mounted silencer assemblies are generally undesirable since soot and other engine room airborne contaminants can be ingested into the engine reducing power produced by combustion of the fuel/air mixture and subjecting the engine to premature damage and wear due to abrasion from the entrained contaminants. The silencer assemblies are inherently costly and complex.

The subject invention provides a relatively inexpensive noise attenuating air cleaner assembly which has a large dust accumulating capacity, a long service life, produces minimal airflow restriction and has air cleaner and silencer assemblies that are easy to assemble an disassemble. The invention also provides engine induction noise attenuation through the use of a silencer assembly and noise absorbing surfaces. The noise attenuating air cleaner assembly construction consists of fewness of parts all contained within a space efficient compact design.

The present invention is directed to overcome one or more of the problems as set forth above.

DISCLOSURE OF THE INVENTION

In one aspect of the invention, a noise attenuating air cleaner assembly is adapted for connection to an inlet passage defined in a housing of a turbocharger. The inlet passage has a central axis. An adapter assembly is removably secured to the housing and defines an aperture having a central axis axially aligned with the central axis of the inlet passage. An air filter cartridge assembly having a central axis is generally axially aligned with the central axis of the adapter assembly. The filter cartridge assembly includes a first end, a second end, and a preselected length taken along the central axis. The filter cartridge assembly is connectable to the adapter assembly to pass air flow generally radially inwardly through the cartridge assembly along the preselected length towards the central axis of the filter cartridge assembly. A noise attenuating end wall assembly closes the second end of the filter cartridge assembly. A tubular silencer assembly is removably secured to the adapter assembly and defines an air passage of a preselected length that is less than the preselected length of the cartridge assembly. The silencer assembly is located generally within the silencer assembly and generally axially aligned with the central axis of the aperture for axial flow of air therethrough.

BRIEF DESCRIPTION OF THE DRAWINGS

FIG. 1 is a diagrammatic side partially sectional view of the present invention;

FIG. 2 is a diagrammatic end view of the present invention taken along lines 2—2 of FIG. 1;

FIG. 3 is an enlarged diagrammatic partially sectional view of the present invention.

BEST MODE FOR CARRYING OUT THE INVENTION

Figure 4:
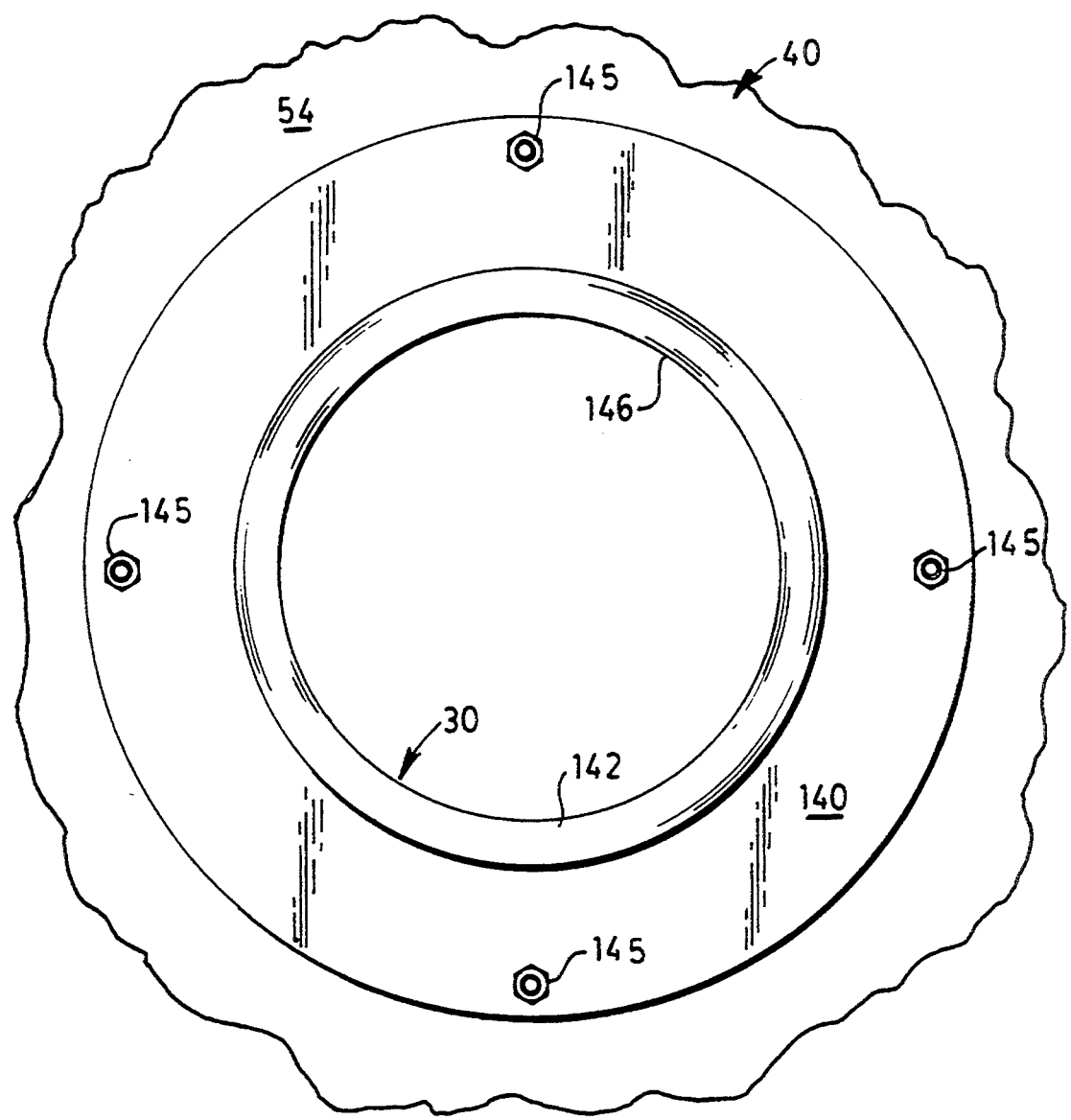
FIG. 4 is a diagrammatic end view of the silencer assembly taken along lines 4—4 of FIG. 3.

Referring to FIGS. 1, 2, and 3, a noise attenuating air cleaner assembly 10 for an internal combustion engine is shown. The noise attenuating air cleaner assembly 10 is adapted for connection to an air induction system 12 of an engine, not shown. The air induction system 12 in this specific instance includes a turbocharger 14. The turbocharger 14 including a housing 16 defining an inlet passage 18 having a central axis 20. The turbocharger 14 is operatively connected to the engine in a conventional manner. It is recognized that the engine may include a plurality of turbochargers 14 whereupon a noise attenuating air cleaner assembly 10 for each would conventionally be employed.

The noise attenuating air cleaner assembly 10 includes an adapter assembly 26, a tubular air filter cartridge assembly 28, a tubular silencer assembly 30, and a support assembly 32.

As best shown in FIGS. 1 and 3, the adapter assembly 26 includes a disk plate 40, an adapter ring 42, a plurality of gusset plates 44, a plurality of tab plates 46, and a plurality of arcuate centering plates 48. The disk plate 40 includes a first outer disk surface 52, a second inner disk surface 54, and an outer peripheral disk surface 56. The adapter ring 42 includes an outer peripheral ring surface 60, a first outer side surface 62, and a second inner side surface 64. The first outer disk surface 52 of the disk plate 40 is secured, such as by welding to the second inner side surface 64 of the adapter ring 42. The plurality of gusset plates 44 extend radially outwardly from the outer peripheral ring surface 60 and are secured, such as by welding, to the peripheral ring surface and the first outer disk surface 52 of the disk plate 40. In this specific instance, there are four gusset plates 44 spaced generally equally around the outer peripheral ring surface 60.

The arcuate centering plates 48 are secured, such as by welding to the outer peripheral disk surface 56 and extend axially outwardly therefrom on the opposite side from the adapter ring 42. In this specific instance, there are four centering plates 48 having a preselected arcuate length spaced generally equally around the outer peripheral disk surface 56.

The tab plates 46 are secured, such as by welding to the second inner disk surface 54 and extend radially outwardly past the outer peripheral disk surface 56. In this specific instance, there are four tab plates 46 equally spaced between the ends of the arcuate centering plates 48.

The adapter assembly 26 is removably secured to the housing 16 by a plurality of cap screws 70 and defines a tapered aperture 72 having a central axis 74 axially aligned with the central axis 20 of the inlet passage 18.

The tubular air filter cartridge assembly 28 having a central axis 78 includes a cylindrical filter element 80 having a generally rectangular cross-section enclosed between an outer perforated protective metal sleeve 82 defining a preselected outside diameter and an inner perforated metal sleeve 84 defining a preselected inside diameter. In the preferred embodiment, the filter element 80 is formed from pleated paper, it is recognized, however, that the filter element could also be formed of, for example, felt or other porous perforated cleaning medium. In this specific instance, the outer diameter of the tubular air filter cartridge assembly 28 is approximately 711 mm, the preselected inside diameter is approximately 549 mm, and the preselected length is approximately 508 mm. The pleats of the filter medium run generally parallel to each other and longitudinally with the axis 78. There are approximately 960 convolutions having a depth of approximately 76.2 mm and an effective filtering area of approximately 71.7M$^2$.

The cartridge assembly 28 further includes a first cartridge metal disk end 88 defining a first cartridge end surface 90 and a second cartridge metal disk end 92 defining a second cartridge end surface 94. The first cartridge disk end 88 defines a first cartridge end 96 and the second cartridge disk end 92 defines a second cartridge end 98. The first and second cartridge disk ends 88 and 92 are secured, such as by welding to the outer and inner sleeves 82 and 84. The tubular air filter cartridge assembly 28 defines a preselected length taken along the central axis 78.

A noise attenuating end wall assembly 102 closes inside diameter of the cartridge assembly 28 adjacent the second cartridge end 98. The noise attenuating end wall assembly 102 include a noise attenuating disk 104 having a predetermined thickness enclosed between an outer metal impervious end wall 106 and an inner perforated metal end wall 108. In the preferred embodiment, the noise attenuating disk is a cellulose, however, it is recognized that other noise attenuating material such as felt could be used. The end wall assembly 102 is secured, such as by welding to the inner sleeve 84, however, it is recognized that the end wall assembly could be removeably secured to the cartridge assembly 28 and serviced separately.

An elastomeric o-ring seal 112 is bonded to the first cartridge end surface 90. The second cartridge end 98 of the cartridge assembly 28 is piloted in the arcuate centering plates 48 of the adapter assembly 26, with the central axis 78 in generally axially aligned with the central axis 74 of the adapter assembly. The elastomeric o-ring seal 112 seals the space between the first cartridge end surface 90 and the second inner disk surface 54 of the adapter assembly 26.

As best shown in FIGS. 2 and 3, the support assembly 32 includes a pair of crossed metal channels 116 and 118, a plurality of tie bolts 120 and a plurality of nuts 122. The channels 116 and 118 are adapted to engage the first cartridge end surface 90 of the cartridge assembly 28. The threaded tie bolts 120 pass through a channel aperture 124 defined in the outer ends of each of the channels 116 and 118 and through a tab aperture 126 defined in each of the tab plates 46. The nuts 122 are tighten on the ends of the tie bolts 120 to secure the cartridge assembly 28 to the adapter assembly 26.

The tubular silencer assembly 30 includes a noise attenuating tubular silencer element 130 having a generally rectangular cross-section. The tubular silencer element 130 in this specific instance is made from cellulose, however, it is recognized that other noise attenuating materials such as felt could be used. The tubular silencer element 130 is enclosed between an outer impervious metal silencer sleeve 132 defining a preselected outside diameter and an inner perforated metal silencer sleeve 134 defining a preselected inside diameter. As best shown in FIGS. 3 and 4, the ends of the outer and inner silencer sleeves 132 and 134, adjacent the adapter assembly 26 are secured, such as by welding to a base plate 140. A metal bellmouth air directing adapter 142 is secured such as by welding, to the opposite ends of the outer and inner silencer sleeves 132 and 134.

The tubular silencer assembly 30 is removably secured to the adapter assembly 26 by a plurality of capscrews 144 that are threaded into weldnuts 145 welded to the base plate 140 of the tubular silencer assembly 30. The silencer assembly 30 defines an air passage 146 generally axially aligned with the central axis 74 of the aperture 72 for axial flow of air therethrough. The air passage 146 has a preselected axial length that is less than one-half of the preselected axial length of the air filter cartridge assembly 28. In this specific instance, the preselected outer diameter of the silencer assembly 30 is approximately 294 mm, the preselected inner diameter is approximately 252 mm and the preselected length is approximately 190 mm.

INDUSTRIAL APPLICABILITY

The air filter cartridge assembly 28 is connectable to the adapter assembly 26 to pass air flow generally radially inwardly through the cartridge assembly 28 along the preselected length towards the central axis 78 of the cartridge assembly. The preselected length of the air passage 146 defined by the silencer assembly 30 is less than the preselected length of the cartridge assembly 28. The silencer assembly 30 is arranged generally concentric within the cartridge assembly 28 and generally axially aligned with the central axis 74 of the aperture 72 for axial flow of air therethrough after it passed through the cartridge assembly 28. The air cleaner assembly 10 requires only space to accommodate the required flow rate since the silencer assembly 30 is arranged concentric within the cartridge assembly 28. Transmitted induction noise generated by the engine and the flow of the air as it is being drawn into the engine is absorbed by the noise attenuating end wall assembly 102 and the silencer assembly 30. The subject invention provides a relatively inexpensive noise attenuating air cleaner assembly 10 which has a large dust accumulating capacity, a long service life, produces minimal airflow restriction and has air filter cartridge 28 and silencer assemblies 30 that are easy to assemble and disassemble.

We claim:

1. A noise attenuating engine inlet, comprising:
   an air induction device of an engine, said air induction device including a housing defining a first inlet passage having a central axis;
   an adapter plate mounted to said housing, said adapter plate defining an aperture axially aligned with said first inlet passage;
   an air filter disposed about the central axis of said first inlet passage upstream of said adapter plate and said housing, said air filter having a first end sealingly disposed against said adapter plate and a second open end opposite said first end;
   a noise attenuating wall closing said second open end of said air filter; and
   a tubular silencer mounted to said adapter plate and disposed entirely within said air filter, said tubular silencer defining a second inlet passage having a central axis coaxial with the central axis of said first inlet passage for directing air received through said air filter into said air induction device.

2. The noise attenuating engine inlet of claim 1, wherein said air induction device is a turbocharger.

3. The noise attenuating engine inlet of claim 1, wherein said air filter is a tubular cartridge assembly including a filter element formed of paper having a plurality of pleats, said plurality of pleats running generally parallel to one another and longitudinally with respect to said tubular cartridge assembly.

4. The noise attenuating engine inlet of claim 3, wherein the surface area of said filter element is approximately 71.7 meters squared for each cubic meter per minute of air flow therethrough.

5. The noise attenuating engine inlet of claim 1, wherein said tubular silencer is a tubular silencer assembly including a noise attenuating tubular silencer element having a generally rectangular cross-section, said silencer element being enclosed by an outer impervious silencer sleeve and an inner perforated silencer sleeve.

6. The noise attenuating engine inlet of claim 5, wherein said the noise attenuating tubular silencer element is formed from noise attenuating cellulose.

7. The noise attenuating engine inlet of claim 5, wherein said air filter has a predetermined length and said tubular silencer assembly extends within said air filter less than one-half said predetermined length.

8. The noise attenuating engine inlet of claim 1, wherein said noise attenuating wall includes a noise attenuating disk element enclosed by an outer impervious silencer wall and an inner perforated silencer wall.

9. The noise attenuating engine inlet of claim 8, wherein said noise attenuating disk element is formed from noise attenuating cellulose.

10. The noise attenuating engine inlet of claim 1, wherein said noise attenuating wall is mounted within the second open end of said air filter.

11. A noise attenuating air cleaner assembly adapted for mounting to an air induction system of an engine, the air induction system defining an inlet passage having a central axis, the noise attenuating air cleaner assembly comprising:
   an adapter plate defining an aperture having a central axis, said adapter plate being adapted for mounting to an inlet passage of an air induction system with said central axis of said aperture axially aligned with the inlet passage of the air induction system;
   an air filter disposed about said aperture, said air filter having a first end sealingly disposed against said adapter plate and a second open end opposite said first end;
   a first noise attenuating wall closing said second open end of said air filter; and
   a tubular silencer mounted to said adapter plate about said aperture and extending within and being substantially enclosed by said air filter upstream of the inlet passage of the air induction system for directing air received through said air filter into said air induction device, said tubular silencer defining an inlet passage having a central axis coaxial with said central axis of said aperture;
   wherein said tubular silencer includes a second noise attenuating wall disposed about said inlet passage.

12. The noise attenuating air cleaner assembly of claim 11, wherein said air filter is a tubular cartridge assembly including a filter element formed of paper having a plurality of pleats, said plurality of pleats running generally parallel to one another and longitudinally with respect to said tubular cartridge assembly.

13. The noise attenuating engine inlet of claim 12, wherein the surface area of said filter element is approximately 71.7 meters squared for each cubic meter per minute of air flow therethrough.

14. The noise attenuating air cleaner assembly of claim 11, wherein said second noise attenuating wall includes a noise attenuating tubular element, said inlet passage and said second noise attenuating wall together defining said tubular silencer assembly.

15. The noise attenuating air cleaner assembly of claim 14, wherein said noise attenuating tubular element defines said inlet passage, said noise attenuating tubular element having a generally rectangular cross-section and being enclosed by an outer impervious silencer sleeve and an inner perforated silencer sleeve.

16. The noise attenuating air cleaner assembly of claim 15, wherein said noise attenuating tubular element is formed from noise attenuating cellulose.

17. The noise attenuating air cleaner assembly of claim 14, wherein said air filter has a predetermined length and said tubular silencer assembly extends within said air filter less than one-half said predetermined length.

18. The noise attenuating air cleaner assembly of claim 11, wherein said first noise attenuating wall includes a noise attenuating disk element enclosed by an outer impervious silencer wall and an inner perforated silencer wall.

19. The noise attenuating air cleaner assembly of claim 18, wherein said noise attenuating disk element is formed from noise attenuating cellulose.

20. The noise attenuating air cleaner assembly of claim 18, wherein said noise attenuating disk element is mounted within said second open end of said air filter.

* * * * *